United States Patent
Zhu et al.

(10) Patent No.: US 11,876,224 B2
(45) Date of Patent: Jan. 16, 2024

(54) NEGATIVE ELECTRODE ACTIVE MATERIAL AND PRODUCTION METHOD THEREFOR

(71) Applicant: DIC Corporation, Tokyo (JP)

(72) Inventors: Peixin Zhu, Chiba (JP); Shinji Kato, Chiba (JP); Ryuuichi Kiyooka, Chiba (JP); Katsuhito Kuroki, Chiba (JP); Satoshi Katano, Chiba (JP); Takahito Ikuma, Chiba (JP)

(73) Assignee: DIC Corporation, Tokyo (JP)

( * ) Notice: Subject to any disclaimer, the term of this patent is extended or adjusted under 35 U.S.C. 154(b) by 389 days.

(21) Appl. No.: 16/765,875

(22) PCT Filed: Nov. 27, 2018

(86) PCT No.: PCT/JP2018/043507
§ 371 (c)(1),
(2) Date: May 21, 2020

(87) PCT Pub. No.: WO2019/107336
PCT Pub. Date: Jun. 6, 2019

(65) Prior Publication Data
US 2020/0365893 A1  Nov. 19, 2020

(30) Foreign Application Priority Data

Dec. 1, 2017  (JP) ................................. 2017-231692

(51) Int. Cl.
| | | |
|---|---|---|
| H01M 4/58 | (2010.01) | |
| H01M 4/04 | (2006.01) | |
| H01M 4/48 | (2010.01) | |
| H01M 10/0525 | (2010.01) | |
| H01M 4/02 | (2006.01) | |

(52) U.S. Cl.
CPC ........... *H01M 4/58* (2013.01); *H01M 4/0471* (2013.01); *H01M 4/48* (2013.01); *H01M 10/0525* (2013.01); *H01M 2004/027* (2013.01)

(58) Field of Classification Search
None
See application file for complete search history.

(56) References Cited

U.S. PATENT DOCUMENTS

| | | | |
|---|---|---|---|
| 2005/0214644 A1 | 9/2005 | Aramata et al. | |
| 2011/0159368 A1* | 6/2011 | Hirose | H01M 10/0525 429/231.8 |
| 2012/0121981 A1 | 5/2012 | Harimoto et al. | |
| 2015/0132643 A1 | 5/2015 | Sasaki | |
| 2015/0214548 A1* | 7/2015 | Ohno | H01M 4/364 252/510 |
| 2017/0279123 A1* | 9/2017 | Nakayama | H01M 4/139 |

FOREIGN PATENT DOCUMENTS

| | | |
|---|---|---|
| JP | 2005310759 | 11/2005 |
| JP | 2016139579 | 8/2016 |
| JP | 2017062974 | 3/2017 |
| WO | 2013002157 | 1/2013 |
| WO | 2014098070 | 6/2014 |

OTHER PUBLICATIONS

Extended European Search Report, dated Aug. 22, 2021, for application EP18882580.6A (Year: 2021).*
Weinmann et al., Handbook of Advanced Ceramics (Second Edition), 2013, Chapter 4 (Year: 2013).*
S. J. Widgeon et al., "29Si and 13C Solid-State NMR Spectroscopic Study of Nanometer-Scale Structure and Mass Fractal Characteristics of Amorphous Polymer Derived Silicon Oxycarbide Ceramics," Chemistry of Materials, vol. 22, No. 23, Nov. 10, 2010, pp. 6221-6228.
Jan Kaspar et al., "Impact of the electrical conductivity on the lithium capacity of polymer-derived silicon oxycarbide (SiOC) ceramics," Electrochimica Acta, vol. 216, Oct. 20, 2016, pp. 196-202.
"International Search Report (Form PCT/ISA/210) of PCT/JP2018/043507," dated Mar. 5, 2019, with English translation thereof, pp. 1-3.
Monika Wilamowska-Zawlocka, et al., "Silicon oxycarbide ceramics as anodes for lithiumion batteries: influence of carbon content on lithium storage capacity," RSC Advances, Oct. 2016, pp. 104597-104607.
Jan Kaspar, et al., "Silicon oxycarbide/nano-silicon composite anodes for Li-ion batteries: Considerable influence of hano-crystalline vs. nano-amorphous silicon embedment on the electrochemical properties," Journal of Power Sources, vol. 269, Jun. 2014, pp. 164-172.

* cited by examiner

*Primary Examiner* — Alix E Eggerding
(74) *Attorney, Agent, or Firm* — JCIPRNET

(57) ABSTRACT

An object of the present invention is to provide a negative electrode active material having excellent charge/discharge characteristics (charge and discharge capacities, initial coulombic efficiency, and cycle characteristics). The object is achieved by providing a negative electrode active material containing: a silicon-based inorganic compound (a) composed of silicon (excluding zerovalent silicon), oxygen, and carbon; and silicon (zerovalent) (b). The equivalent constituent ratio [Q units/(D units+T units+Q units)] indicating the chemical bonding state (D units [$SiO_2C_2$], T units [$SiO_3C$], Q units[$SiO_4$]) of the silicon (excluding zerovalent silicon) present in the silicon-based inorganic compound (a) is within the range of from 0.30 to 0.80 inclusive.

8 Claims, No Drawings

NEGATIVE ELECTRODE ACTIVE MATERIAL AND PRODUCTION METHOD THEREFOR

CROSS-REFERENCE TO RELATED APPLICATION

This application is a 371 application of an international PCT application serial no. PCT/JP2018/043507, filed on Nov. 27, 2018, which claims the priority benefit of Japan application JP2017-231692, filed on Dec. 1, 2017. The entirety of each of the above-mentioned patent applications is hereby incorporated by reference herein and made a part of this specification.

TECHNICAL FIELD

The present invention relates to a negative electrode active material used to form a negative electrode of a lithium ion secondary battery etc. and to a method for producing the negative electrode active material.

BACKGROUND ART

With the recent spread of mobile devices such as smartphones, there is an increasing demand for small high-capacity secondary batteries. In particular, the use of lithium ion secondary batteries (sometimes referred to as LIBs) in electric vehicles is increasing rapidly, and the range of applications of lithium ion secondary batteries is constantly expanding. Carbonaceous graphite active materials (natural and artificial) are widely used as negative electrode materials of lithium ion secondary batteries. However, since the theoretical capacity density of graphite is low (372 mAh/g), improvement in battery capacity is approaching its limit while the technique for forming lithium ion secondary batteries is advancing.

It is therefore contemplated to use an active material composed of a silicon-based material using silicon and an oxide thereof that can be alloyed with lithium ions in order to increase the capacity and energy density of a lithium ion secondary battery. Silicon oxycarbide (sometimes denoted by SiOC) is a material including free carbon and a ceramic skeleton composed of Si, O, and C and is receiving attention because of its charge/discharge cycle characteristics higher than those of other high-capacity active materials. However, one drawback of SiOC is low charge and discharge capacities and low initial coulombic efficiency due to its structural limitation, and therefore SiOC has not been in practical use. In one method that has been studied to solve the above problem, SiOC is complexed with silicon, a silicon alloy, or silicon oxide. For example, PTL 1 proposes a lithium ion secondary battery negative electrode material composed of composite particles containing SiOC and 5 to 30% by volume of active material particles composed of silicon particles or carbon-coated silicon particles. PTL 2 discloses silicon-based inorganic oxide composite particles in which fine particles of silicon, a silicon alloy, or silicon oxide are complexed with SiOC used as an inorganic binder and in which spherical or flake graphite is introduced. NPL 1 discloses a method for obtaining a SiOC/n-Si composite material by mixing commercial polysilane (RD-684A) and nano silicon n-Si and then firing the mixture.

However, the introduced silicon or silicon alloy powder is reduced in size because of repeated volume expansion and contraction during charge/discharge. It is known that this causes disconnection of conduction paths and cycle characteristics thereby deteriorate. In the above conventional techniques, chemical bonds in SiOC are not sufficiently studied, and no consideration is given to the correlation between performance and a structure present between SiOC and silicon etc. in the additive phase. Therefore, the improvement in charge/discharge characteristics (this means that the charge and discharge capacities, the initial coulombic efficiency, and the cycle characteristics are improved simultaneously) is limited.

PTL 1: Japanese Unexamined Patent Application Publication No. 2016-139579
PTL 2: Japanese Unexamined Patent Application Publication No. 2005-310759
NPL 1: Jan Kaspar, et al., Silicon oxycarbide/nano-silicon composite anodes for Li-ion batteries: Considerable influence of nano-crystalline vs. nano-amorphous silicon embedment on the electrochemical properties. Journal of Power Sources, 269 (2014), 164-172.

SUMMARY OF INVENTION

Technical Problem

In view of the above circumstances, an object of the present invention is to provide a negative electrode active material having excellent charge/discharge characteristics (charge and discharge capacities, initial coulombic efficiency, and cycle characteristics).

Solution to Problem

To achieve the above object, the present inventors have conducted extensive studies with a mind to utilize silicon particles (zerovalent silicon) for the purpose of obtaining high capacity. Specifically, the studies have been conducted with attention given to the structure of a (zerovalent) silicon-containing SiOC composite active material that can improve and maximize the charge/discharge characteristics. The inventors have found that a negative electrode active material which contains silicon (zerovalent) and has a silicon-based inorganic compound structure composed of silicon (excluding zerovalent silicon), oxygen, and carbon and in which the silicon (excluding zerovalent silicon) is in a specific chemical bonding state and the carbon is in a specific chemical bonding state exhibits good charge/discharge characteristics. The inventors have thus arrived at the present invention.

Accordingly, the present invention relates to a negative electrode active material (which may be referred to as the active material of the invention) which contains a silicon-based inorganic compound (a) composed of silicon (excluding zerovalent silicon), oxygen, and carbon and silicon (zerovalent) (b) and in which an equivalent constituent ratio [Q units/(D units+T units+Q units)] that indicates the chemical bonding state (the D units [$SiO_2C_2$], the T units [$SiO_3C$], the Q units [$SiO_4$]) of the silicon (excluding the zerovalent silicon) present in the silicon-based inorganic compound (a) is within the range of from 0.30 to 0.80 inclusive.

The present invention also relates to a negative electrode containing the negative electrode active material of the present invention.

The present invention also relates to a battery using the negative electrode including the negative electrode active material of the present invention.

The present invention also relates to a method for producing the negative electrode active material of the present invention. The method for producing the negative electrode active material includes step 1 of obtaining a precursor (c) by mixing and dispersing at least a suspension of silicon (zerovalent), a polysiloxane compound, and a carbon source resin and then drying the mixture, step 2 of obtaining a fired product (d) by firing the precursor (c) obtained in step 1 in an inert atmosphere at a maximum firing temperature in the temperature range of from 900° C. to 1250° C. inclusive, and optional step 3 of obtaining the negative electrode active material by pulverizing and classifying the fired product (d) obtained in step 2.

Advantageous Effects of Invention (1) Excellent charge/discharge characteristics can be obtained. Specifically, good charge and discharge capacities, good initial coulombic efficiency, and good cycle characteristics can be achieved simultaneously.

(2) The silicon-based inorganic compound has an excellent protective effect. Therefore, even when general-purpose silicon particles having a relatively large diameter (for example, particles with a diameter of 300 nm or less are usable) are used, the obtained negative electrode active material exhibits excellent charge/discharge characteristics. Therefore, a mass-production process using silicon (zerovalent) particles that can be prepared using a general-purpose pulverization technique can be applied.

The mechanism of the above significant effect of the present invention is not clear, but currently estimated facts are shown below.

The "silicon-based inorganic compound" used in the present invention is "SiOC" described in Background Art described above, includes the skeleton structure composed of Si, O, and C, and further includes free carbon. The silicon-based inorganic compound itself in the present invention serves as a negative electrode active material that stores and releases lithium ions and has the function of protecting silicon (zerovalent) particles. In the silicon-based inorganic compound in the present invention, the silicon present in the skeleton structure composed of Si, O, and C is in a specific chemical bonding state. Therefore, the structural matching state between the silicon-based inorganic compound and the silicon particles (zerovalent) is good. Since the carbon present as the free carbon is in a specific chemical bonding state, the balance between the structure of crystalline carbon and the structure of amorphous carbon is good, and the Si—O—C skeleton structure and the free carbon form a three-dimensionally entangled structure in the silicon-based inorganic compound. In this case, when the silicon-based inorganic compound is used in a battery negative electrode, the compound may flexibly follow a change in volume of the silicon (zerovalent) during charge/discharge.

Therefore, in the negative electrode active material of the present invention, the silicon-based inorganic compound has the effect of effectively protecting the silicon (zerovalent) particles, and this gives the effect of maintaining conduction paths and a proper volume cushioning effect, so that excellent charge/discharge characteristics can be obtained.

DESCRIPTION OF EMBODIMENTS

The present invention will be described in detail.
The present invention relates to:
Item 1. A negative electrode active material containing a silicon-based inorganic compound (a) composed of silicon (excluding zerovalent silicon), oxygen, and carbon and silicon (zerovalent) (b), wherein an equivalent constituent ratio [Q units/(D units+T units+Q units)] indicating the chemical bonding state (D units [$SiO_2C_2$], T units [$SiO_3C$], and Q units [$SiO_4$]) of the silicon (excluding the zerovalent silicon) in the silicon-based inorganic compound (a) is within the range of from 0.30 to 0.80 inclusive (this negative electrode active material may be hereinafter referred to as the negative electrode active material of the present invention).

Item 2. The negative electrode active material, wherein a peak corresponding to $SiC_4$ bonding structure units is present, and an equivalent constituent ratio [$SiC_4$ bonding/($SiC_4$ bonding structure units+D units+T units+Q units)] is within the range of 0.05 to 0.55.

Item 3 relates to the negative electrode active material according to Item 1, wherein the loss of weight due to thermal decomposition up to 1000° C. in air is within the range of from 5% by mass to 60% by mass inclusive.

Item 4 relates to a negative electrode including the negative electrode active material of the present invention.

Item 5 relates to a battery that uses a negative electrode containing the negative electrode active material of the present invention.

Item 6 relates to a method for producing the negative electrode active material of the present invention, the method including step 1 of obtaining a precursor (c) by mixing and dispersing a suspension of silicon (zerovalent), a polysiloxane compound, and a carbon source resin and then drying the dispersion, step 2 of obtaining a fired product (d) by firing the precursor (c) obtained in step 1 in an inert atmosphere at a maximum firing temperature in the temperature range of from 900° C. to 1250° C. inclusive, and optional step 3 of obtaining the negative electrode active material by pulverizing and classifying the fired product (d) obtained in step 2.

Item 7 relates to the method for producing the negative electrode active material according to Item 6, wherein, before the firing in the inert atmosphere in step 2 in Item 6, the precursor (c) obtained in step 1 is subjected to oxidation treatment in an oxygen-containing atmosphere in the temperature range of from 200° C. to 440° C. inclusive.

Item 8 relates to the method for producing the negative electrode active material according to Item 6, wherein the polysiloxane compound is a composite resin having a silanol group and/or a hydrolysable silyl group and having a polysiloxane segment and a polymer segment other than the polysiloxane segment.

Item 9 relates to the method for producing the negative electrode active material according to Item 6, wherein the carbon source resin is a resin containing an aromatic hydrocarbon moiety.

In the negative electrode active material of the present invention, the silicon present in the silicon-based inorganic compound (a) is in a specific chemical bonding state. Therefore, the silicon (zerovalent) particles are supported in the soft silicon-based inorganic compound, and this may prevent disconnection of conduction paths due to expansion and contraction of the silicon (zerovalent) particles and a reduction in their size when the negative electrode active material is used in a battery negative electrode. Since the carbon present in the silicon-based inorganic compound (a) is in a specific chemical bonding state, lithium ion conductivity higher than that of general SiOC is obtained, and good conduction paths are obtained. This may be the reason that the characteristics of the supported silicon (zerovalent) (b) can be maintained over repeated cycles.

<Description of Silicon-Based Inorganic Compound (a)>

The silicon-based inorganic compound (a) used in the negative electrode active material of the present invention is a structure composed of silicon (excluding zerovalent silicon), oxygen, and carbon. The equivalent constituent ratio [Q units/(D units+T units+Q units)] that indicates the chemical bonding state of the silicon (excluding zerovalent silicon) present in the silicon-based inorganic compound (a) is adjusted within the range of 0.30 to 0.80, and therefore the negative electrode active material having the above-described good charge/discharge characteristics can be obtained.

The structural units used in the equivalent constituent ratio (the description of the chemical bonding state of silicon) of the silicon (excluding zerovalent silicon) are an expression method of the chemical bonding state of the silicon (excluding zerovalent silicon) that is well-known to those skilled in the art. Silicon in the form of $SiO_2C_2$ is expressed as a D unit. Silicon in the form of $SiO_3C$ is expressed as a T unit, and silicon in the form of $SiO_4$ is expressed as a Q unit. These can be easily identified by $^{29}Si$ solid NMR measurement.

It is well-known that the equivalent constituent ratio [Q units $(SiO_4)$/(D units $(SiO_2C_2)$+T units $(SiO_3C)$+Q units $(SiO_4)$)] that indicates the chemical bonding state of the silicon (excluding zerovalent silicon) in the silicon-based inorganic compound (a) is involved in the chemical structure of SiOC and has a strong influence on the charge/discharge characteristics. As the relative amount of "C" in the Si—O—C skeleton increases, i.e., the amount of $SiO_3C$, $SiO_2C_2$, and $SiOC_3$ structures relative to the amount of $SiO_4$ increases, good cycle characteristics is obtained, but the charge and discharge capacities and the initial coulombic efficiency tend to decrease. Therefore, if the relative amount of the $SiO_4$ structure is small (less than 0.30), a large amount of silicon (zerovalent) must be added in order to improve the charge and discharge capacities, so that significant volume expansion of the electrode during charge/discharge and a reduction in cycle characteristics cannot be avoided.

Although the ability of the $SiO_4$ structure to store lithium ions is high, $Li_2SiO_4$ generated by the reaction between part of the $SiO_4$ structure and lithium ions is highly chemically stable, and the stored lithium ions are not released from $Li_2SiO_4$ sites. This leads to an increase in irreversible capacity, and the initial coulombic efficiency decreases. Moreover, since the electron conductivity of $Li_2SiO_4$ is poor, it is feared that the electrical conductivity may decrease. Therefore, when the constituent equivalent ratio [Q units/(D units+T units+Q units)] of the silicon (excluding zerovalent silicon) exceeds 0.8, the reversible charge/discharge capacity and the initial coulombic efficiency decrease.

In the silicon-based inorganic compound (a) in the present invention, free carbon is present together with the Si—O—C skeleton structure. The free carbon has excellent electrical conductivity. When the carbon contained is present in a specific chemical bonding state, the balance between the structure of crystalline carbon and the structure of amorphous carbon is good, and the Si—O—C skeleton structure and the free carbon can form a three-dimensionally entangled structure in the silicon-based inorganic compound (a). Therefore, when the silicon-based inorganic compound (a) is used in a battery negative electrode, the compound may flexibly follow a change in volume of the silicon (zerovalent) during charge/discharge. The $SiC_4$ bonding component is presumed to be formed by the reaction between part of free carbon and silicon. When the equivalent constituent ratio [$SiC_4$ bonding/($SiC_4$ bonding structure units+D units+T units+Q units)] is within the range of 0.05 to 0.55, the performance can be further improved, although the mechanism of this effect is unclear. The reason for this may be that the $SiC_4$ bonding component is present around highly reactive silicon (zerovalent) and prevents a side reaction. The $SiC_4$ bonding component can be computed from a peak (around −20 ppm) corresponding to the $SiC_4$ bonding structure units in the $^{29}Si$ solid NMR spectrum.

<Description of Silicon (Zerovalent)>

The negative electrode active material of the present invention contains the silicon-based inorganic compound (a) and further contains the silicon (zerovalent) (b). The presence of the silicon (zerovalent) particles can improve the charge and discharge capacities of the negative electrode and its initial coulombic efficiency.

As for the size of primary particles of the silicon (zerovalent) that can be used in the present invention, the average particle diameter (weight distribution) identified by dynamic light scattering is 20 nm to 500 nm, and the upper limit of the particle diameter is more preferably 300 nm and still more preferably 150 nm.

A thin film of silicon oxide may be present on the surface of the silicon (zerovalent) particles, or the silicon (zerovalent) particles may be coated with a metal oxide other than silicon oxide. No particular limitation is imposed on the type of metal oxide. Examples of the metal oxide include titanium oxide, manganese oxide, alumina, and zinc oxide. No particular limitation is imposed on the thickness of the oxide thin film so long as the oxide thin film does not impede conduction of lithium ions and transition of electrons during charge/discharge, and the thickness of the oxide thin film is preferably 10 nm or less. For the purpose of increasing the chemical affinity with the silicon-based inorganic compound (a) to prevent aggregation, organic modification groups may be bonded to the surface of the silicon (zerovalent) particles. No particular limitation is imposed on the organic modification groups so long as the above purpose can be achieved. A general-purpose silane coupling agent and a dispersant described later can be used.

<Description of Loss of Weight Due to Thermal Decomposition>

In the silicon-based inorganic compound (a) used in the negative electrode active material of the present invention, not only the chemical bonding state of carbon but also the amount of the free carbon present has a large influence on the charge/discharge characteristics. If the amount of carbon is insufficient, the electrical conductivity is poor, and the charge/discharge characteristics may deteriorate. If the amount of carbon is excessively large, the charge and discharge capacities of the active material as a whole decrease because the theoretical capacity of the free carbon itself is low.

In the silicon-based inorganic compound in the present invention, the free carbon present in portions other than the Si—O—C skeleton is likely to thermally decompose in air, and the amount of the free carbon present can be computed from the value of thermal weight loss. The loss of weight due to thermal decomposition can be easily identified using a thermogravimeter-differential thermal analyzer (TG-DTA). However, since the "C" in the Si—O—C skeleton has a very strong chemical bond, its thermal stability is very high, and oxidative decomposition is very difficult.

The free carbon in the present invention has a structure similar to the structure of hard carbon and undergoes thermal decomposition in air in the temperature range of about 600° C. to about 900° C., so that a rapid reduction in weight occurs. No particular limitation is imposed on the maximum temperature of the TG-DTA measurement. However, to fully complete the thermal decomposition reaction, it is preferable to perform the TG-DTA measurement in air under the condition of up to 1000° C. Because of the reason described above, the obtained value of the weight loss represents the amount of the free carbon present. In the present invention, the amount of the carbon is preferably in the range of 5% by mass to 60% by mass.

<Description of Production Method>

A method for producing the negative electrode active material of the present invention will be described.

The negative electrode active material of the present invention can be produced through step 1 of obtaining a precursor (c) by mixing and dispersing a suspension of silicon (zerovalent), a polysiloxane compound, and a carbon source resin and then drying the mixture, step 2 of obtaining a fired product (d) by firing the precursor (c) obtained in step 1 in an inert atmosphere, and step 3 of obtaining the negative electrode active material by pulverizing the fired product (d) obtained in step 2.

<Description of Each Step>

<Step 1>

No particular limitation is imposed on the method for obtaining the suspension of silicon (zerovalent). A method in which commercial fine metallic silicon particles are added to an organic solvent to obtain a suspension may be used, or a method in which commercial fine metallic silicon particles are pulverized and then a suspension of silicon (zerovalent) in an organic solvent is obtained may be used. The pulverization may be dry pulverization. However, a wet pulverization method having the effect of effectively preventing the oxidation reaction of the silicon (zerovalent) particles during pulverization is preferably used for the pulverization of the silicon (zerovalent) particles because a suspension can be directly obtained. No particular limitation is imposed on the pulverizer, and a jet mill, a ball mill, a bead mill, etc. can be used.

The purity of the raw material of the silicon (zerovalent) used in the present invention is preferably 97% or higher and more preferably 99.0% or higher. No particular limitation is imposed on the organic solvent, and any hydrocarbon solvent can be used so long as it does not chemically react with the silicon (zerovalent). Examples of the solvent include: ketones such as acetone, methyl ethyl ketone, methyl isobutyl ketone, and diisobutyl ketone; alcohols such as ethanol, methanol, normal propyl alcohol, and isopropyl alcohol; and aromatic compounds such as benzene, toluene, and xylene.

No particular limitation is imposed on the concentration of the obtained suspension of the silicon (zerovalent), but the concentration is within the range of 5 to 40% by mass, and it is more preferable to adjust the concentration to 10 to 30% by mass. The average diameter of the obtained silicon (zerovalent) particles is measured by a dynamic light scattering method and is within the range of 20 nm to 500 nm, and the upper limit of the particle diameter is more preferably 300 nm and still more preferably 150 nm.

In the step of pulverizing the silicon (zerovalent) used for the negative electrode active material of the present invention, a dispersant may be used in order to prevent aggregation of the silicon (zerovalent) particles. No particular limitation is imposed on the type of dispersant so long as it can prevent aggregation of the silicon (zerovalent) particles and has a pulverizing effect. Examples of the dispersant include polymer-type dispersants such as polycarboxylic acid partial alkyl ester-based dispersants, polyether-based dispersants, and polyalkylene polyamine-based dispersants; surfactant-type dispersants such as polyol ester-based dispersants and alkyl polyamine-based dispersants; and inorganic-type dispersants such as polyphosphate-based dispersants.

In the step of pulverizing the silicon (zerovalent), a silane coupling agent may be used. The silane coupling agent is an organic silicon compound having, in its molecule, a functional group reactable with and bondable to an organic material and also a functional group reactable with and bondable to a film of silicon (zerovalent) oxide, and its general structure is represented as follows: Y—R—Si—$(X)_3$. Here, Y is the functional group reactable with and bondable to an organic material, and representative examples thereof include a vinyl group, an epoxy group, and an amino group. X is the functional group reactable with a film of silicon (zerovalent) oxide and is hydrolyzed by water or moisture to generate silanol, and the silanol reacts with and is bonded to the oxide film on the silicon (zerovalent). Representative example of X include an alkoxy group, an acetoxy group, and a chloro atom.

When the dispersant or the silane coupling agent is used, the surface of the silicon (zerovalent) is reformed, and the dispersiveness of the silicon (zerovalent) particles in the precursor can be improved. This may give a preferred effect on homogenization of the material.

No particular limitation is imposed on the polysiloxane compound used to produce the negative electrode active material of the present invention so long as it is a resin containing at least one of a polycarbosilane structure, a polysilazane structure, a polysilane structure, and a polysiloxane structure. One of these resins may be used alone, or a composite resin containing one of these resins as a segment chemically bonded to another polymer segment may be used. The form of the composite is a graft copolymer, a block copolymer, a random copolymer, an alternating copolymer, etc. Examples of the composite resin include a composite resin having a graft structure in which a polysiloxane segment is chemically bonded to a side chain of a polymer segment and a composite resin having a block structure in which a polysiloxane segment is chemically bonded to a terminal of a polymer segment.

Preferably, the polysiloxane segment has a structural unit represented by the following general formula (S-1 and/or a structural unit represented by the following general formula (S-2).

[Chem. 1]

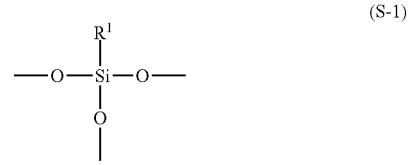

(S-1)

[Chem. 2]

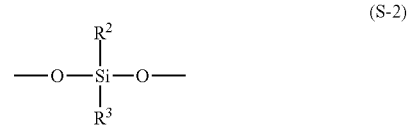

(S-2)

(In general formulas (S-1) and (S-2), $R^1$ represents an aromatic hydrocarbon substituent or an alkyl group. $R^2$ and $R^3$ each represent an alkyl group, a cycloalkyl group, an aryl group, or an aralkyl group.)

Examples of the alkyl group include a methyl group, an ethyl group, a propyl group, an isopropyl group, a butyl group, an isobutyl group, a sec-butyl group, a tert-butyl group, a pentyl group, an isopentyl group, a neopentyl group, a tert-pentyl group, a 1-methylbutyl group, a 2-methylbutyl group, a 1,2-dimethylpropyl group, a 1-ethylpropyl group, a hexyl group, an isohexyl group, a 1-methylpentyl group, a 2-methylpentyl group, a 3-methylpentyl group, a 1,1-dimethylbutyl group, a 1,2-dimethylbutyl group, a 2,2-dimethylbutyl group, a 1-ethylbutyl group, a 1,1,2-trimethylpropyl group, a 1,2,2-trimethylpropyl group, a 1-ethyl-2-methylpropyl group, and a 1-ethyl-1-methylpropyl group. Examples of the cycloalkyl group include a cyclopropyl group, a cyclobutyl group, a cyclopentyl group, and a cyclohexyl group.

Examples of the aryl group include a phenyl group, a naphthyl group, a 2-methylphenyl group, a 3-methylphenyl group, a 4-methylphenyl group, a 4-vinylphenyl group, and a 3-isopropylphenyl group.

Examples of the aralkyl group include a benzyl group, a diphenylmethyl group, and a naphthylmethyl group.

Examples of the polymer segment other than the polysiloxane segment in the polysiloxane compound include vinyl polymer segments such as acrylic polymers, fluoroolefin polymers, vinyl ester polymers, aromatic-based vinyl polymers, and polyolefin polymers; and polymer segments such as polyurethane polymer segments, polyester polymer segments and polyether polymer segments. Of these, vinyl polymer segments are preferred.

The polysiloxane compound may be a composite resin in which a polysiloxane segment and a polymer segment are bonded through a structure represented by the following structural formula (S-3) and may have a three-dimensional network polysiloxane structure.

[Chem. 3]

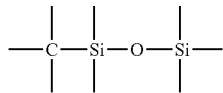

(S-3)

(In the above formula, the carbon atom is a carbon atom included in the polymer segment, and the two silicon atoms are silicon atoms included in the polysiloxane segment.)

The polysiloxane segment included in the polysiloxane compound may have a functional group such as a polymerizable double bond that is reactable under heating. By subjecting the polysiloxane compound to heat treatment before thermal decomposition, a crosslinking reaction proceeds to form a solid. This can facilitate the thermal decomposition treatment.

Examples of the polymerizable double bond include a vinyl group and a (meth)acryloyl group. The number of polymerizable double bonds present in the polysiloxane segment is preferably two or more, more preferably 3 to 200, and still more preferably 3 to 50. By using a composite resin having two or more polymerizable double bonds as the polysiloxane compound, the crosslinking reaction can easily proceed.

The polysiloxane segment may have a silanol group and/or a hydrolysable silyl group. Examples of the hydrolysable group in the hydrolysable silyl group include a halogen atom, an alkoxy group, a substituted alkoxy group, an acyloxy group, a phenoxy group, a mercapto group, an amino group, an amido group, an aminooxy group, an iminooxy group, and an alkenyloxy group. When any of these groups is hydrolyzed, the hydrolysable silyl group is converted to a silanol group. When the hydrolysis condensation reaction between the hydroxyl groups in silanol groups and the hydrolysable groups in hydrolysable silyl groups proceeds together with the thermosetting reaction, a solid polysiloxane compound can be obtained.

The silanol group in the present invention is a silicon-containing group having a hydroxyl group directly bonded to the silicon atom. The hydrolysable silyl group in the present invention is a silicon-containing group having a hydrolysable group directly bonded to the silicon atom, and specific examples of the hydrolysable silyl group include a group represented by the following general formula (S-4).

[Chem. 4]

(S-4)

(In the above formula, $R^4$ represents a monovalent organic group such as an alkyl group, an aryl group, or an aralkyl group, and $R^5$ represents a halogen atom, an alkoxy group, an acyloxy group, an allyloxy group, a mercapto group, an amino group, an amido group, an aminooxy group, an iminooxy group, or an alkenyloxy group. b is an integer of 0 to 2.)

Examples of the alkyl group include a methyl group, an ethyl group, a propyl group, an isopropyl group, a butyl group, an isobutyl group, a sec-butyl group, a tert-butyl group, a pentyl group, an isopentyl group, a neopentyl group, a tert-pentyl group, a 1-methylbutyl group, a 2-methylbutyl group, a 1,2-dimethylpropyl group, a 1-ethylpropyl group, a hexyl group, an isohexyl group, a 1-methylpentyl group, a 2-methylpentyl group, a 3-methylpentyl group, a 1,1-dimethylbutyl group, a 1,2-dimethylbutyl group, a 2,2-dimethylbutyl group, a 1-ethylbutyl group, a 1,1,2-trimethylpropyl group, a 1,2,2-trimethylpropyl group, a 1-ethyl-2-methylpropyl group, and a 1-ethyl-1-methylpropyl group.

Examples of the aryl group include a phenyl group, a naphthyl group, a 2-methylphenyl group, a 3-methylphenyl group, a 4-methylphenyl group, a 4-vinylphenyl group, and a 3-isopropylphenyl group.

Examples of the aralkyl group include a benzyl group, a diphenylmethyl group, and a naphthylmethyl group.

Examples of the halogen atom include a fluorine atom, a chlorine atom, a bromine atom, and an iodine atom.

Examples of the alkoxy group include a methoxy group, an ethoxy group, a propoxy group, an isopropoxy group, a butoxy group, a sec-butoxy group, and a tert-butoxy group.

Examples of the acyloxy group include formyloxy, acetoxy, propanoyloxy, butanoyloxy, pivaloyloxy, pentanoyloxy, phenylacetoxy, acetoacetoxy, benzoyloxy, and naphthoyloxy.

Examples of the allyloxy group include phenyloxy and naphthyloxy.

Examples of the alkenyloxy group include a vinyloxy group, an allyloxy group, a 1-propenyloxy group, an isopropenyloxy group, a 2-butenyloxy group, a 3-butenyloxy group, a 2-petenyloxy group, a 3-methyl-3-butenyloxy group, and 2-hexenyloxy group.

Examples of the polysiloxane segment having the structural unit represented by general formula (S-1) and/or the structural unit represented by general formula (S-2) include polysiloxane segments having the following structures.

[Chem. 5]

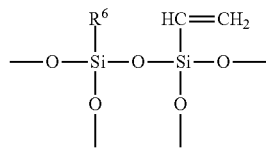
(1)

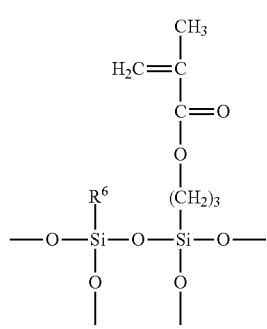
(2)

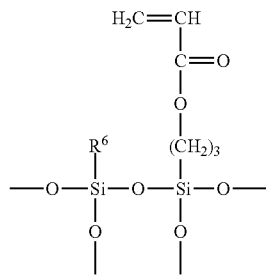
(3)

[Chem. 6]

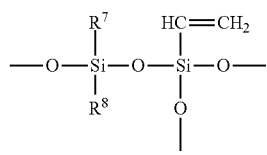
(4)

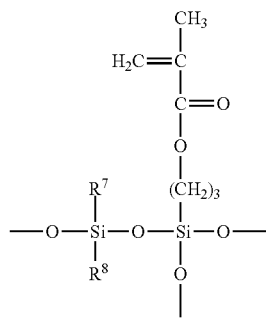
(5)

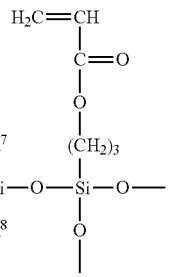
(6)

[Chem. 7]

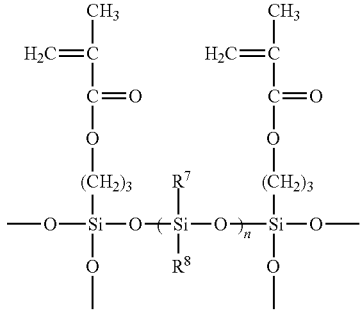
(7)

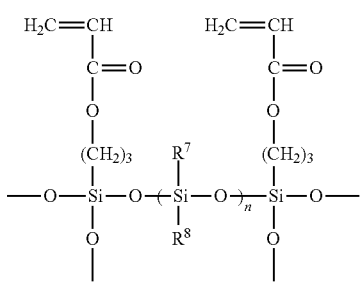
(8)

The polymer segment may have optional functional groups so long as the effects of the invention are not impaired. Examples of the functional groups that can be used include a carboxyl group, a blocked carboxyl group, a carboxylic anhydride group, a tertiary amino group, a hydroxyl group, a blocked hydroxyl group, a cyclocarbonate group, an epoxy group, a carbonyl group, a primary amido group, secondary amido group, a carbamate group, and a functional group represented by the following structural formula (S-5).

[Chem. 8]

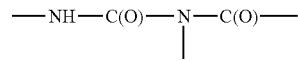
(S-5)

The polymer segment may have a polymerizable double bond such as a vinyl group or a (meth)acryloyl group.

The polysiloxane compound used in the present invention can be produced by a well-known method. In particular, it is preferably to produce the polysiloxane compound using methods shown in (1) to (3) below. However, the production method is not limited to these methods.

(1) A method including preparing, as the raw material of the above-described polymer segment, a polymer segment containing a silanol group and/or a hydrolysable silyl group in advance, mixing the polymer segment and a silane compound containing a silane compound having a silanol group and/or a hydrolysable silyl group and further having a polymerizable double bond, and allowing a hydrolysis condensation reaction to proceed.

(2) A method including the following. A polymer segment containing a silanol group and/or a hydrolysable silyl group is prepared in advance as the raw material of the above-described polymer segment. A silane compound containing a silane compound having a silanol group and/or a hydrolysable silyl group and further having a polymerizable double bond is subjected to a hydrolysis condensation reaction to produce polysiloxane in advance. The polymer segment and the polysiloxane are mixed and subjected to a hydrolysis condensation reaction.

(3) A method including mixing the above-described polymer segment, a silane compound containing a silane compound having a silanol group and/or a hydrolysable silyl group and further having a polymerizable double bond, and polysiloxane and allowing a hydrolysis condensation reaction to proceed.

No particular limitation is imposed on the carbon source resin so long as it is carbonized by high-temperature sintering in an inert atmosphere and its miscibility with the polysiloxane compound during production of the precursor is good. It is preferable to use a synthetic resin having an aromatic functional group or a natural chemical raw material having an aromatic functional group. From the viewpoint of low cost, availability, and removal of impurities, it is more preferable to use a phenolic resin.

Examples of the synthetic resin include: thermoplastic resins such as polyvinyl alcohol and polyacrylic acid; and thermosetting resins such as a phenolic resin and a furan resin. Examples of the natural chemical raw material include heavy oils, particularly tars and pitches such as coal tars, tar light oils, tar middle oils, tar heavy oils, naphthalene oils, anthracene oils, coal tar pitches, pitch oils, mesophase pitches, oxygen-bridged petroleum pitches, and heavy oils.

In the precursor production step, the silicon (zerovalent) suspension, the polysiloxane compound, and the carbon source resin are mixed uniformly. Then the solvent is removed, and the mixture is dried to thereby obtain the precursor. No particular limitation is imposed on the device used to mix the raw materials, and a general-purpose device having dispersing and mixing functions can be used. In particular, a stirrer, an ultrasonic mixer, a premixing disperser, etc. may be used. In the solvent removal and drying operation performed for the purpose of removing the organic solvent by evaporation, a dryer, a vacuum dryer, a spray dryer, etc. may be used.

It is preferable that the silicon (zerovalent) is added in an amount of 3 to 50% by mass relative to the weight of the precursor, that the polysiloxane compound is added in an amount of 15 to 85% by mass in terms of solids relative to the weight of the precursor, and that the amount of the carbon source resin in terms of solids is set to 3 to 70% by mass relative to the weight of the precursor. It is more preferable that the amount of the silicon (zerovalent) added in terms of solids is set to 8 to 40% by mass, that the amount of the polysiloxane compound in terms of solids is set to 20 to 70% by mass, and that the amount of the carbon source resin in terms of solids is set to 3 to 60% by mass.

<Step 2>

In step 2, the precursor is fired at high temperature in an inert atmosphere to completely decompose thermally decomposable organic components, and the firing conditions are precisely controlled to obtain a fired product suitable for the negative electrode active material of the present invention from other main components. Specifically, the energy of the high-temperature treatment allows a dehydration condensation reaction to proceed, and "Si—O" bonds present in the raw material polysiloxane compound form a Si—O—C skeleton structure. Moreover, the uniformly dispersed carbon source resin is carbonized and transformed to free carbon in a three-dimensional structure having the Si—O—C skeleton.

In step 2, the precursor obtained in step 1 is fired in an inert atmosphere according to a firing program. The maximum firing temperature is the maximum temperature set and has a strong influence on the structure and performance of the fired product. In the present invention, the maximum firing temperature is preferably 900° C. to 1250° C. and more preferably 1000° C. to 1150° C. When the firing is performed in this temperature range, the material having the above-described chemical bonding states of silicon and carbon can have a good microstructure, and oxidation of the silicon (zerovalent) during sintering at excessively high temperature can be avoided, so that better charge/discharge characteristics can be obtained.

No particular limitation is imposed on the firing method. A reaction device having the function of heating in a given atmosphere may be used, and a continuous process or a batch process can be used. The firing device may be appropriately selected from a fluidized bed reactor, a rotary furnace, a vertical moving bed reactor, a tunnel furnace, a batch furnace, a rotary kiln according to the intended purpose.

Before the firing of the precursor, oxidation treatment may be performed. The oxidation treatment allows a thin oxide film to be formed on the surface of the silicon (zerovalent). In this case, the surface of the silicon (zerovalent) is prevented from being exposed to an electrolyte when the negative electrode active material is used in a battery. Therefore, the effect of preventing decomposition of the electrolyte can be obtained, and the cycle characteristics of the active material can be improved. The oxidation treatment conditions are preferably a temperature range of 200° C. to 440° C. in air and more preferably 300° C. to 420° C.

No particular limitation is imposed on the above-described inert atmosphere so long as it does not contain oxidative gas. In particular, nitrogen, argon, etc. can be used, and a reducing atmosphere such as a nitrogen/hydrogen gas mixture, pure hydrogen, or carbon monoxide can be used.

<Step 3>

In step 3, the fired product obtained in step 2 is pulverized and optionally classified to obtain the negative electrode active material of the present invention. The pulverization may be performed in one step until the intended particle size is obtained or may be performed in several steps. For example, when the fired product in the form of lumps or aggregated particles of 10 mm or more is used to produce an active material of 10 μm, a jaw crusher, a roll crusher, etc. is used to coarsely pulverize the fired product to form particles of about 1 mm. Then the particles are pulverized to 100 μm using, for example, a grow mill or a ball mill and further pulverized to 10 μm using, for example, a bead mill or a jet mill. The particles produced by pulverization may contain coarse particles. To remove the coarse particles or to remove fine powder to control the particle size distribution, classification is performed. The classifier used is selected from an air classifier, a wet classifier, etc. according to the intended purpose. To remove coarse particles, it is preferable to use a classification method using a sieve because the purpose can be achieved reliably. When the shape of the precursor mixture is controlled to have a particle diameter close a target particle diameter by, for example, spray drying before the final firing and then the resulting mixture with the controlled shape is subjected to the final firing, the pulverization step can, of course, be omitted.

The average particle diameter (dynamic light scattering) of the negative electrode active material of the present invention obtained by the above production method is preferably 500 nm to 50 µm, more preferably 1 µm to 40 µm, and still more preferably 2 to 20 µm.

<Production of Negative Electrode>

As described above, the negative electrode active material of the present invention has excellent charge/discharge characteristics. Therefore, when the negative electrode active material is used for a battery negative electrode, the battery negative electrode has good charge/discharge characteristics.

Specifically, the negative electrode active material of the present invention and an organic binder are used as essential components to form a slurry containing other optional components such as a conductive aid, and the slurry is used to form a thin film on a current collector copper foil to thereby form a negative electrode.

Alternatively, a commonly used carbon material such as graphite may be added to the slurry to produce the negative electrode. Examples of the carbon material such as graphite include natural graphite, artificial carbon, hard carbon, and soft carbon.

The thus-obtained negative electrode contains, as its active material, the negative electrode active material of the present invention and is therefore a high-capacity secondary battery negative electrode having excellent cycle characteristics and also having excellent initial coulombic efficiency. The negative electrode can be obtained, for example, by kneading the secondary battery negative electrode active material, a binder used as the organic binding, and a solvent using a disperser such as a stirrer, a ball mill, a super sand mill, or a pressure kneader to prepare a negative electrode slurry and then applying the slurry to the current collector to form a negative electrode layer. Alternatively, the negative electrode can be obtained by forming a paste-like electrode slurry into, for example, a sheet shape or a pellet shape and integrating the resulting product with the current collector.

No particular limitation is imposed on the organic binder. Examples of the organic binder include: styrene-butadiene rubber (SBR) copolymers; (meth)acrylic copolymers formed from ethylenically unsaturated carboxylic acid esters (such as methyl (meth)acrylate, ethyl (meth)acrylate, butyl (meth)acrylate, (meth)acrylonitrile, and hydroxyethyl (meth)acrylate) and ethylenically unsaturated carboxylic acids (such as acrylic acid, methacrylic acid, itaconic acid, fumaric acid, and maleic acid); and polymer compounds such as polyvinylidene fluoride, polyethylene oxide, polyepichlorohydrin, polyphosphazene, polyacrylonitrile, polyimide, polyamide-imide, and carboxymethyl cellulose (CMC).

These organic binders are in the form of a water dispersion, in the form of an aqueous solution, or in the form of a solution in an organic solvent such as N-methyl-2-pyrrolidone (NMP), and this depends on their physical properties. The content of the organic binder in the negative electrode layer of the lithium ion secondary battery negative electrode is preferably 1 to 30% by mass, more preferably 2 to 20% by mass, and still more preferably 3 to 15% by mass.

When the content of the organic binder is 1% by mass or more, good adhesion is obtained, and breakage of the negative electrode structure due to expansion/contraction during charge/discharge is prevented. When the content of the organic binder is 30% by mass or less, an increase in electrode resistance can be prevented.

In practice, the negative electrode active material of the present invention can be handled with ease because its chemical stability is high and a water-based binder can be used.

A conductive aid may be optionally mixed into the negative electrode slurry. Examples of the conductive aid include carbon black, graphite, acetylene black, and electrically conductive oxides, nitrides, etc. The amount of the conductive aid used may be about 1 to about 15% by mass relative to the negative electrode active material of the present invention.

No particular limitation is imposed on the material and shape of the current collector. The current collector used may be formed from, for example, copper, nickel, titanium, stainless steel, etc. and shaped into a foil strip, a perforated foil strip, a mesh strip, etc. A porous material such as a porous metal (foamed metal) or carbon paper can also be used.

No particular limitation is imposed on the method for applying the negative electrode slurry to the current collector. Examples of the method include well-known methods such as a metal mask printing method, an electrostatic coating method, a dip coating method, a spray coating method, a roll coating method, a doctor blade method, a gravure coating method, and a screen printing method. It is preferable that, after the application, the current collector is optionally subjected to rolling treatment using, for example, a flat plate press or calender rolls.

The negative electrode slurry formed into, for example, a sheet or pellet shape and the current collector can be integrated by a well-known method using, for example, rolls, a press, or a combination thereof.

Preferably, the negative electrode layer formed on the current collector and the negative electrode layer integrated with the current collector are subjected to heat treatment according to the organic binder used. When, for example, a commonly used water-based styrene-butadiene rubber (SBR) copolymer is used, the heat treatment may be performed at 100 to 130° C. When an organic binder having a polyimide or polyamide-imide main skeleton is used, the heat treatment is performed at preferably 150 to 450° C.

The solvent is removed by the heat treatment, and the binder is cured. This causes an increase in strength, and the adhesion between the particles and the adhesion between the current collector and the particles can be increased. Preferably, the heat treatment is performed in a vacuum atmosphere or an inert atmosphere such as helium, argon, or nitrogen in order to prevent oxidation of the current collector during the treatment.

It is preferable that, after the heat treatment, the negative electrode is pressed (subjected to pressing treatment). In a secondary battery negative electrode using the negative electrode active material of the present invention, the density of the electrode is preferably 1.0 to 1.8 g/cm$^3$, more preferably 1.1 to 1.7 g/cm$^3$, and still more preferably 1.2 to 1.6 g/cm$^3$. As the density of the electrode increases, the adhesion and the volume capacity density of the electrode tend to increase. However, if the density is excessively high, the number of voids in the electrode decreases, and the effect of reducing volume expansion by the silicon etc. is weakened, so that the cycle characteristics deteriorate.

<Structure of Full Cell>

As described above, the negative electrode using the negative electrode active material of the present invention is excellent in charge/discharge characteristics and can be used for any secondary battery without limitation. The negative electrode is used preferably for non-aqueous electrolyte secondary batteries and solid electrolyte secondary batteries. In particular, when the negative electrode is used for a non-aqueous electrolyte secondary battery, excellent performance is exerted.

The battery of the present invention is characterized by including the above-described negative electrode of the present invention. For example, when the negative electrode is used for a wet electrolyte secondary battery, the battery can be produced by disposing a positive electrode and the negative electrode of the present invention so as to face each other with a separator therebetween and pouring an electrolyte.

The positive electrode can be obtained by forming a positive electrode layer on a current collector in the same manner as the negative electrode. The current collector used in this case may be formed from a metal such as aluminum, titanium, or stainless steel or an alloy and shaped into a foil strip, a perforated foil strip, a mesh strip, etc.

No particular limitation is imposed on the positive electrode material used for the positive electrode layer. When a non-aqueous electrolyte secondary battery, specifically a lithium ion secondary battery, is produced, no particular limitation is imposed on the positive electrode material, and a metal compound, a metal oxide, a meal sulfide, or a conductive polymer material that can be doped or intercalated with lithium ions may be used. For example, any of lithium cobaltate ($LiCoO_2$), lithium nickelate ($LiNiO_2$), lithium manganate ($LiMnO_2$), and complex oxides thereof ($LiCo_xNi_yMn_zO_2$, x+y+z=1), lithium manganese spinel ($LiMn_2O_4$), a lithium vanadium compound, $V_2O_5$, $V_6O_{13}$, $VO_2$, $MnO_2$, $TiO_2$, $MoV_2O_8$, $TiS_2$, $V_2S_5$, $VS_2$, $MoS_2$, $MoS_3$, $Cr_3O_8$, $Cr_2O_5$, olivine-type $LiMPO_4$ (M: Co, Ni, Mn, Fe), conductive polymers such as polyacetylene, polyaniline, polypyrrole, polythiophene, and polyacene, porous carbon may be used alone or as a mixture.

The separator used may be, for example, a nonwoven fabric composed mainly of polyolefin such as polyethylene or polypropylene, a cloth, a microporous film, or any combination thereof. When the positive and negative electrodes of a non-aqueous electrolyte secondary battery to be produced do not come into direct contact with each other, it is unnecessary to use the separator.

The electrolyte used may be a so-called organic electrolyte prepared by dissolving a lithium salt such as $LiClO_4$, $LiPF_6$, $LiAsF_6$, $LiBF_4$, or $LiSO_3CF_3$ in a single non-aqueous solvent such as ethylene carbonate, propylene carbonate, butylene carbonate, vinylene carbonate, fluoroethylene carbonate, cyclopentanone, sulfolane, 3-methylsulfolane, 2,4-dimethylsulfolane, 3-methyl-1,3-oxazolidin-2-one, γ-butyrolactone, dimethyl carbonate, diethyl carbonate, ethyl methyl carbonate, methyl propyl carbonate, butyl methyl carbonate, ethyl propyl carbonate, butyl ethyl carbonate, dipropyl carbonate, 1,2-dimethoxyethane, tetrahydrofuran, 2-methyltetrahydrofuran, 1,3-dioxolane, methyl acetate, or ethyl acetate or in a mixture of two or more of these solvents.

No particular limitation is imposed on the structure of the battery of the present invention. Generally, the positive electrode, the negative electrode, and the optional separator are wound into a flat spiral shape to form a wound electrode plate assembly. When the positive electrode, the negative electrode, and the optional separator each have a flat plate shape, they are stacked to form a stacked electrode plate assembly. Generally, the battery has a structure in which one of these electrode assemblies is sealed in an exterior case.

Half cells used in Examples of the present invention have a structure in which the negative electrode is composed mainly of the silicon-containing active material of the present invention. Simple evaluation was performed using metal lithium as a counter electrode. This is to clearly compare the cycle characteristics of the active material itself. It is of course possible that a small amount of the silicon-containing active material is added to a mixture composed mainly of a graphite-based active material (capacity: about 340 mAh/g) to obtain a negative electrode capacity of about 400 to 700 mAh/g, which is much higher than the capacity of an existing negative electrode, to thereby improve the cycle characteristics, as described above.

<Description of Applications Etc.>

No particular limitation is imposed on the secondary battery using the negative electrode active material of the present invention. The secondary battery is used as a paper type battery, a button type battery, a coin type battery, a stacked battery, a cylindrical battery, or a square battery.

The above-described negative electrode active material of the present invention can be applied to electrochemical devises, such as hybrid capacitors and solid lithium secondary batteries, that use a charge/discharge mechanism in which lithium ions are intercalated and deintercalated.

EXAMPLES

Production of Polysiloxane Compound

Synthesis Example 1: Synthesis of Condensation Product (m-1) of Methyltrimethoxysilane A reaction vessel equipped with a stirrer, a thermometer, a dropping funnel, a condenser tube, and a nitrogen gas inlet was charged with 1,421 parts by mass of methyltrimethoxysilane (hereinafter abbreviated as "MTMS"), and the temperature was increased to 60° C. Next, a mixture of 0.17 parts by mass of iso-propyl acid phosphate ("Phoslex A-3" manufactured by SC Organic Chemical Co., Ltd.) and 207 parts by mass of deionized water was added dropwise to the reaction vessel over 5 minutes, and the resulting mixture was stirred at a temperature of 80° C. for 4 hours to allow a hydrolysis condensation reaction to proceed.

The condensation product obtained by the hydrolysis condensation reaction was distilled at a temperature of 40 to 60° C. under a reduced pressure of 1.3 kPa (the pressure reducing condition at the beginning of removal of methanol was 40 kPa, and the pressure was finally reduced to 1.3 kPa. The same applies to the following.) to remove water and methanol generated during the reaction process, and 1,000 parts by mass of a solution (active component: 70% by mass) containing the condensation product (m-1) of MTMS having a number average molecular weight of 1,000 was thereby obtained.

The active component is a value computed by dividing a theoretical yield (parts by mass) when all the methoxy groups in the silane monomer such as the MTMS undergo the condensation reaction by the actual yield (parts by mass) after the condensation reaction, i.e., [the theoretical yield (parts by mass) when all the methoxy groups in the silane monomer undergo the condensation reaction/the actual yield (parts by mass) after the condensation reaction].

Synthesis Example 2: Synthesis of Polysiloxane Compound (PS-1)

A reaction vessel equipped with a stirrer, a thermometer, a dropping funnel, a condenser tube, and a nitrogen gas inlet was charged with 150 parts by mass of isopropyl alcohol (hereinafter abbreviated as "IPA"), 105 parts by mass of phenyltrimethoxysilane (hereinafter abbreviated as "PTMS"), and 277 parts by mass of dimethyldimethoxysilane (hereinafter referred to as "DMDMS"), and the temperature was increased to 80° C.

Then, at this temperature, a mixture containing 21 parts by mass of methyl methacrylate, 4 parts by mass of butyl methacrylate, 3 parts by mass of butyl acrylate, 2 parts by mass of 3-methacryloxypropyltrimethoxysilane, 3 parts by mass of IPA, and 0.6 parts by mass of tert-butylperoxy-2-ethylhexanoate was added dropwise to the reaction vessel over 6 hours. After completion of the dropwise addition, the mixture was further reacted at this temperature for 20 hours to obtain an organic solvent solution of a vinyl polymer (a-1) having hydrolysable silyl groups and having a number average molecular weight of 10,000.

Next, a mixture of 0.04 parts by mass of Phoslex A-3 and 112 parts by mass of deionized water was added dropwise over 5 minutes, and the resulting mixture was stirred at this temperature for 10 hours to allow a hydrolysis condensation reaction to proceed to thereby obtain a solution containing a composite resin in which the hydrolysable silyl groups included in the vinyl polymer (a-1) were bonded to hydrolysable silyl groups and silanol groups included in polysiloxane originating from the PTMS and the DMDMS. Next, 472 parts by mass of the solution obtained in Synthesis Example 1 and containing the condensation product (m-1) of MTMS and 80 parts by mass of deionized water were added to the above-obtained solution. The mixture was stirred at the above-described temperature for 10 hours to allow a hydrolysis condensation reaction to proceed. The resulting product was distilled under the same conditions as in Synthesis Example 1 to remove water and methanol generated. Next, 250 parts by mass of IPA was added, and 1,000 parts by mass of a solution of a polysiloxane compound (PS-1) with a nonvolatile content of 60.0% by mass was thereby obtained.

(Production of Half Cell and Measurement of Charge/Discharge Characteristics)

An evaluation half cell using the negative electrode active material of the present invention was assembled in the following manner, and its charge/discharge characteristics were measured.

The negative electrode active material (8 parts), acetylene black (1 part) used as the conductive aid, an organic binder (1 part, ingredients: commercial SBR (0.75 parts)+CMC (0.25 parts), and distilled water (10 parts)) were mixed and stirred for 10 minutes using Awatori Rentarou of the rotation revolution type to thereby prepare a slurry. The slurry was applied to a copper foil with a thickness of 20 μm using an applicator, and the coating was dried at 110° C. under a reduced pressure condition to thereby obtain an electrode thin film with a thickness of about 40 μm. A circular electrode with a diameter of 14 mm was punched from the electrode thin film and pressed at a pressure of 20 MPa. In a glove box in which the concentration of oxygen was low (<10 ppm) and the content of water was very low (dew point: −40° or lower), the electrode of the present invention and a Li foil used as a counter electrode were placed so as to face each other with a 25 μm polypropylene-made separator therebetween, and an electrolyte (1 mol/L $LiPF_6$ manufactured by KISHIDA CHEMICAL Co., Ltd., diethyl carbonate:ethylene carbonate=1:1 (volume ratio)) was caused to adsorb to thereby produce an evaluation half cell (CR2032 type).

A secondary battery charge/discharge tester (HOKUTO DENKO Corporation) was used to measure the characteristics of the battery, and a test for evaluating the charge/discharge characteristics was performed under the conditions of constant-current constant-voltage charge/constant-current discharge at room temperature 25° C. in the cut-off voltage range of 0.005 to 1.5 V using a charge/discharge rate of 0.1 C (first to third cycles) and 0.2 C (fourth and subsequent cycles). Each time switching between charge and discharge was performed, the battery was left open circuit for 30 seconds. The initial coulombic efficiency and the cycle characteristics (in the present application, the capacity retention ratio at the tenth cycle) were determined as follows.

Initial coulombic efficiency (%)=initial discharge capacity (mAh/g)/initial charge capacity (mAh/g)

Capacity retention ratio (tenth cycle)=discharge capacity at tenth cycle (mAh/g)/initial discharge capacity (mAh/g)

Example 1

A commercial silicon powder (manufactured by Kojundo Chemical Lab. Co., Ltd., purity: 99.9%, average particle diameter: 5 μm) was wet-pulverized in an MEK solvent to obtain a silicon (zerovalent) suspension with an average particle diameter of 180 nm and a concentration of 17% by weight. PS-1 described in Synthesis Example 2 and used as the polysiloxane compound, a phenolic resin (IF3300 manufactured by DIC Corporation) used as the carbon source resin, and the above-obtained silicon (zerovalent) suspension were mixed at a given raw material solid (nonvolatile matter) weight ratio (polysiloxane compound/carbon source resin/silicon (zerovalent)=0.6/0.25/0.15) and stirred uniformly. A dried product of a precursor obtained by heat drying was fired in a nitrogen atmosphere at a high temperature of 1100° C. for 2 hours to obtain black solids, and the black solids were pulverized using a planetary ball mill to produce a black powdery active material. The results of measurement by solid NMR ($^{29}$Si, $^{13}$C) showed that the constituent equivalent ratio (Q units/(D units+T units+Q units)) indicating the chemical bonding state of the Si element was 0.64, and the $SiC_4$ equivalent ratio [$SiC_4$ bonding/($SiC_4$ bonding structure units+D units+T units+Q units)] was 0.16. The results of thermal analysis (TG-DTA) measurement in air up to 1000° C. showed a weight loss of 25% by weight.

A battery was produced in the same manner as in the production of the half cell described in (Production of half cell and measurement of charge/discharge characteristics), and the charge/discharge characteristics were measured in the same manner as the measurement method described therein. The measurement results showed good charge/discharge characteristics, i.e., an tnitial discharge capacity of 1290 mAh/g, an initial coulombic efficiency of 74%, and a capacity retention ratio at the tenth cycle of 70%.

Examples 2 to 7

The same production method as in Example 1 was used to produce a precursor at a given compositional ratio of the raw materials (Table 1-1 and Table 1-2), and a negative electrode active material was obtained. The structural analysis data for each of the obtained materials (the constituent equivalent ratio indicating the chemical bonding state of the Si element (Q units/(D units+T units+Q units))) and the SiC$_4$ equivalent ratio [SiC$_4$bonding/(SiC$_4$ bonding structure units+D units+T units+Q units)] are shown in Table 1-1 and Table 1-2.

Example 8

A precursor was prepared under the same conditions as in Example 4 and fired in a nitrogen atmosphere at 1150° C. for 2 hours to obtain an active material. The active material was evaluated in the same manner as in Example 1, and data in Table 1-1 and Table 1-2 was obtained.

Example 9

The same production method as in Example 1 was used to prepare a precursor. The precursor was subjected to pre-oxidation in air at 350° C. for 2 hours and then subjected to high-temperature firing at 1100° C. for 2 hours to obtain black solids. The black solids were evaluated in the same manner as in Example 1, and data in Table 1-1 and Table 1-2 was obtained.

Example 10

The same production method as in Example 1 was used to prepare a precursor. The precursor was subjected to pre-oxidation in air at 400° C. for 2 hours and then subjected to high-temperature firing at 1100° C. for 2 hours to obtain black solids. The black solids were evaluated in the same manner as in Example 1, and data in Table 1-1 and Table 1-2 was obtained.

Example 11

A precursor was prepared under the same conditions as in Example 6. The precursor was fired in a nitrogen atmosphere at a high temperature of 1200° C. for 2 hours. The resulting product was evaluated in the same manner as in Example 1, and data in Table 1-1 and Table 1-2 was obtained.

Example 12

A precursor was prepared under the same conditions as in Example 3. The precursor was fired in a nitrogen atmosphere at a high temperature of 1000° C. for 2 hours. The resulting product was evaluated in the same manner as in Example 1, and data in Table 1-1 and Table 1-2 was obtained.

Comparative Example 1

A precursor was prepared under the same conditions as in Example 6. The precursor was fired in a nitrogen atmosphere at a high temperature of 1250° C. for 2 hours. The resulting product was evaluated in the same manner as in Example 1, and data in Table 1-1 and Table 1-2 was obtained.

Examples 13 to 15 and Comparative Example 2

A pulverized silicon powder with an average particle diameter of 110 nm was used. A precursor ratio shown in Table 1-1 and Table 1-2 was used, and the mixture was treated at a firing temperature shown in Table 1-1 and Table 1-2 to obtain an active material. Each of the active materials was evaluated in the same manner as in Example 1, and data in Table 1-1 and Table 1-2 was obtained.

Examples 16 to 18

A pulverized silicon powder with an average particle diameter of 110 nm was used. A precursor ratio shown in Table 1-1 and Table 1-2 was used, and the mixture was subjected to pre-oxidation treatment and treated at a firing temperature shown in Table 1-1 and Table 1-2 to obtain an active material. Each of the active materials was evaluated in the same manner as in Example 1, and data in Table 1-1 and Table 1-2 was obtained.

TABLE 1-1

|  | Constituent ratio of precursor solids % | | | Average particle diameter of Si (nanoparticles)/nm | Pre-oxidation | Firing temperature |
|---|---|---|---|---|---|---|
|  | Polysiloxane compound (PS-1) | Carbon source resin (IF3300) | Si | | | |
| Example 1 | 0.60 | 0.25 | 0.15 | 180 | None | 1100 |
| Example 2 | 0.42 | 0.26 | 0.32 | 180 | None | 1100 |
| Example 3 | 0.76 | 0.13 | 0.11 | 180 | None | 1100 |
| Example 4 | 0.41 | 0.32 | 0.27 | 180 | None | 1100 |
| Example 5 | 0.63 | 0.13 | 0.24 | 180 | None | 1100 |
| Example 6 | 0.79 | 0.07 | 0.14 | 180 | None | 1100 |
| Example 7 | 0.68 | 0.25 | 0.07 | 180 | None | 1100 |
| Example 8 | 0.41 | 0.32 | 0.27 | 180 | None | 1150 |
| Example 9 | 0.60 | 0.25 | 0.15 | 180 | 350 | 1100 |
| Example 10 | 0.60 | 0.25 | 0.15 | 180 | 400 | 1100 |
| Example 11 | 0.79 | 0.07 | 0.14 | 180 | None | 1200 |
| Example 12 | 0.76 | 0.13 | 0.11 | 180 | None | 1000 |
| Comparative Example 1 | 0.79 | 0.07 | 0.14 | 180 | None | 1250 |
| Example 13 | 0.13 | 0.38 | 0.49 | 110 | None | 1100 |
| Example 14 | 0.13 | 0.38 | 0.49 | 110 | None | 1000 |
| Example 15 | 0.13 | 0.38 | 0.49 | 110 | None | 900 |
| Comparative Example 2 | 0.13 | 0.38 | 0.49 | 110 | None | 800 |
| Example 16 | 0.78 | 0.03 | 0.19 | 110 | 400 | 1100 |
| Example 17 | 0.30 | 0.51 | 0.19 | 110 | 400 | 1100 |
| Example 18 | 0.06 | 0.75 | 0.19 | 110 | 400 | 1100 |

TABLE 1-2

| | SiC4 | Q/(D + T + Q) | sp2/ (sp2 + sp3) | Charge/discharge characteristics of half cell | | | |
|---|---|---|---|---|---|---|---|
| | | | | Weight loss during firing in air % | Initial capacity (mAh/g) | Initial efficiency (%) | Capacity retention rate (10th) (%) |
| Example 1 | 0.16 | 0.64 | 0.82 | 25% | 1290 | 74% | 70% |
| Example 2 | 0.32 | 0.52 | 0.95 | 24% | 1500 | 78% | 60% |
| Example 3 | 0.09 | 0.63 | 0.82 | 16% | 1200 | 72% | 79% |
| Example 4 | 0.31 | 0.55 | 0.92 | 31% | 1480 | 77% | 72% |
| Example 5 | 0.23 | 0.54 | 0.94 | 15% | 1450 | 74% | 70% |
| Example 6 | 0.11 | 0.56 | 0.93 | 9% | 1200 | 71% | 80% |
| Example 7 | 0.10 | 0.71 | 0.80 | 25% | 1020 | 70% | 86% |
| Example 8 | 0.21 | 0.70 | 0.93 | 30% | 1450 | 75% | 73% |
| Example 9 | 0.12 | 0.68 | 0.84 | 26% | 1200 | 72% | 74% |
| Example 10 | 0.13 | 0.73 | 0.87 | 24% | 1220 | 73% | 74% |
| Example 11 | 0.45 | 0.38 | 0.92 | 6% | 910 | 66% | 83% |
| Example 12 | 0.08 | 0.54 | 1.00 | 20% | 1120 | 68% | 76% |
| Comparative Example 1 | 0.55 | 0.25 | 0.89 | 6% | 730 | 52% | 49% |
| Example 13 | 0.30 | 0.34 | 0.91 | 38% | 1750 | 85% | 73% |
| Example 14 | 0.15 | 0.61 | 0.92 | 32% | 1560 | 73% | 64% |
| Example 15 | 0.08 | 0.68 | 0.95 | 30% | 1610 | 71% | 60% |
| Comparative Example 2 | 0.03 | 0.81 | 0.99 | 31% | 1530 | 69% | 45% |
| Example 16 | 0.10 | 0.59 | 0.91 | 4% | 1270 | 71% | 68% |
| Example 17 | 0.11 | 0.50 | 0.86 | 50% | 1201 | 73% | 84% |
| Example 18 | 0.12 | 0.49 | 0.79 | 74% | 1055 | 64% | 61% |

Table 1-1 above shows the precursor composition conditions for each Example, and Table 1-2 shows the analysis results and the charge/discharge characteristics. In the present description, the following good/poor criteria for the charge/discharge characteristics were used. A negative electrode active material having a capacity equal to or higher than that of a commonly used graphite-based active material (340 mAh/g) and a capacity retention ratio at the tenth cycle of 60% or more is rated good (the present invention). It was judged that, if the capacity retention ratio under the above-described evaluation conditions is less than 59%, sufficient cycle characteristics cannot be obtained even when a mixture of the negative electrode active material and a graphite-based active material is used.

Example 19

A negative electrode material mixture of a powdery negative electrode active material obtained under the conditions in Example 1 and graphite (CGB10 manufactured by Nippon Graphite) (10:90, % by weight), a conductive aid (acetylene black), and binders (SBR, CMC) were mixed with distilled water at a given composition ratio (negative electrode material mixture/conductive aid/CMC/SBR=89.5/3/2.5/5, % by weight) to prepare a slurry. Then the slurry was applied to a copper foil and dried at 110° C. under reduced pressure. The results of measurement of the charge/discharge characteristics showed initial charge and discharge capacities of 510 mAh/g and 435 mAh/g, respectively, an initial coulombic efficiency of 85%, and a discharge capacity retention ratio at the tenth cycle of 98%. As can be seen from the results of the evaluation of the battery in Example 19, the negative electrode active material of the present invention has excellent charge/discharge performance.

INDUSTRIAL APPLICABILITY

The negative electrode active material of the present invention is a negative electrode active material including: the silicon-based inorganic compound (a) composed of silicon (excluding zerovalent silicon), oxygen, and carbon; and silicon (zerovalent) (b). The negative electrode active material is characterized in that, in a $^{29}$Si solid NMR spectrum of the silicon-based inorganic compound (a), a plurality of peaks are present in the chemical shift range of +20 ppm to −150 ppm and that the equivalent constituent ratio [Q units/(D units+T units+Q units)] indicating the chemical bonding state (D units [SiO$_2$C$_2$], T units [SiO$_3$C], Q units [SiO$_4$]) of the silicon (excluding zerovalent silicon) is within the range of from 0.30 to 0.80 inclusive. Therefore, when a negative electrode containing the negative electrode active material, a positive electrode, and an electrolyte are combined to form, for example, a lithium ion battery, the lithium ion battery has, for example, better charge/discharge characteristics (such as charge and discharge capacities, initial coulombic efficiency, and cycle characteristics) than conventional lithium ion batteries. The negative electrode active material can be used for various applications that require a small size and a light weight such as mobile electronic devices such as mobile phones, smartphones, notebook personal computers, and mobile personal computers, electric vehicles, ships, hybrid automobiles, airplanes, rockets, and artificial satellites.

The invention claimed is:

1. A negative electrode active material comprising: a silicon-based inorganic compound (a) composed of silicon (excluding zerovalent silicon), oxygen, and carbon; and silicon (zerovalent) (b), wherein, in a $^{29}$Si solid NMR spectrum of the silicon-based inorganic compound (a), a plurality of peaks are present in a chemical shift range of +20 ppm to −150 ppm, and an equivalent constituent ratio [Q units/(D units+T units+Q units)] as determined from the $^{29}$Si solid NMR spectrum indicating a chemical bonding state (D units [SiO$_2$C$_2$], T units [SiO$_3$C], Q units [SiO$_4$]) of the silicon (excluding zerovalent silicon) is within a range of from 0.30 to 0.80 inclusive, and wherein the negative electrode active material is produced by the following steps:

step 1-1 of obtaining a suspension of zerovalent silicon by adding fine metallic silicon particles or pulverized fine metallic silicon particles into an organic solvent;

step 1-2 of obtaining a precursor (c) by mixing and dispersing at least a polysiloxane compound, a resin containing an aromatic hydrocarbon moiety, and the suspension of zerovalent silicon obtained in step 1-1 and then drying the mixture, wherein an amount of the zerovalent silicon in terms of solids is set to 3 to 50% by mass relative to a weight of the precursor (c), an amount of the polysiloxane compound in terms of solids is set to 15 to 85% by mass relative to the weight of the precursor (c), and an amount of the resin containing an aromatic hydrocarbon moiety in terms of solids is set to 3 to 70% by mass relative to the weight of the precursor (c), and step 2 of obtaining a fired product (d) by firing the precursor (c) obtained in step 1-2 in an inert atmosphere at a maximum firing temperature in a temperature range of from 900° C. to 1200° C. inclusive.

2. The negative electrode active material according to claim 1, wherein a peak corresponding to $SiC_4$ bonding structure units is present, and a second equivalent constituent ratio [$SiC_4$ bonding structure units/($SiC_4$ bonding structure units+D units+T units+Q units)] is within a range of 0.05 to 0.55.

3. The negative electrode active material according to claim 1, wherein a loss of weight due to thermal decomposition up to 1000° C. in air is within a range of from 5% by mass to 60% by mass inclusive.

4. A negative electrode comprising the negative electrode active material according to claim 1.

5. A battery comprising the negative electrode according to claim 4.

6. A method for producing the negative electrode active material according to claim 1, the method comprising:

the step 1-1 of obtaining the suspension of the zerovalent silicon;

the step 1-2 of obtaining the precursor (c); and the step 2 of obtaining the fired product (d) by firing the precursor (c) obtained in step 1-2.

7. The method for producing the negative electrode active material according to claim 6, wherein, before the firing in the inert atmosphere in step 2, the precursor (c) obtained in step 1 is subjected to oxidation treatment in an oxygen-containing atmosphere in a temperature range of from 200° C. to 440° C. inclusive.

8. The method for producing the negative electrode active material according to claim 6, wherein the polysiloxane compound is a composite resin having a silanol group and/or a hydrolysable silyl group and having a polysiloxane segment and a polymer segment other than the polysiloxane segment.

* * * * *